Jan. 25, 1955 — O. REDER — 2,700,515
AIRPLANE RAM-JET PROPULSION SYSTEM
Filed March 17, 1952
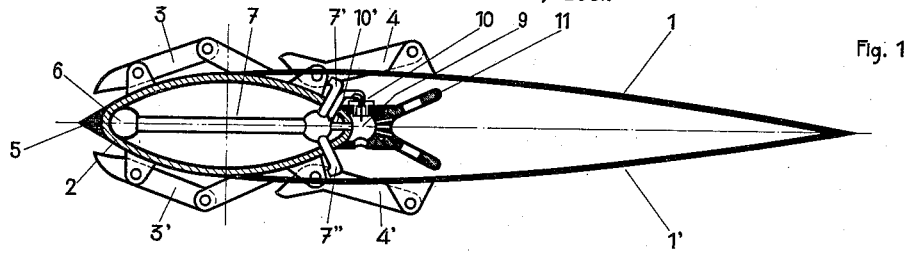
Fig. 1
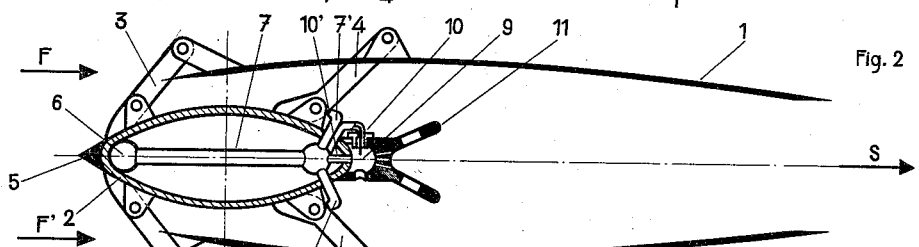
Fig. 2
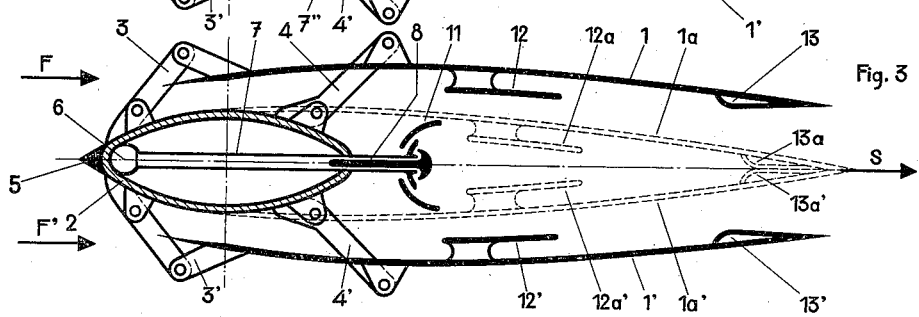
Fig. 3
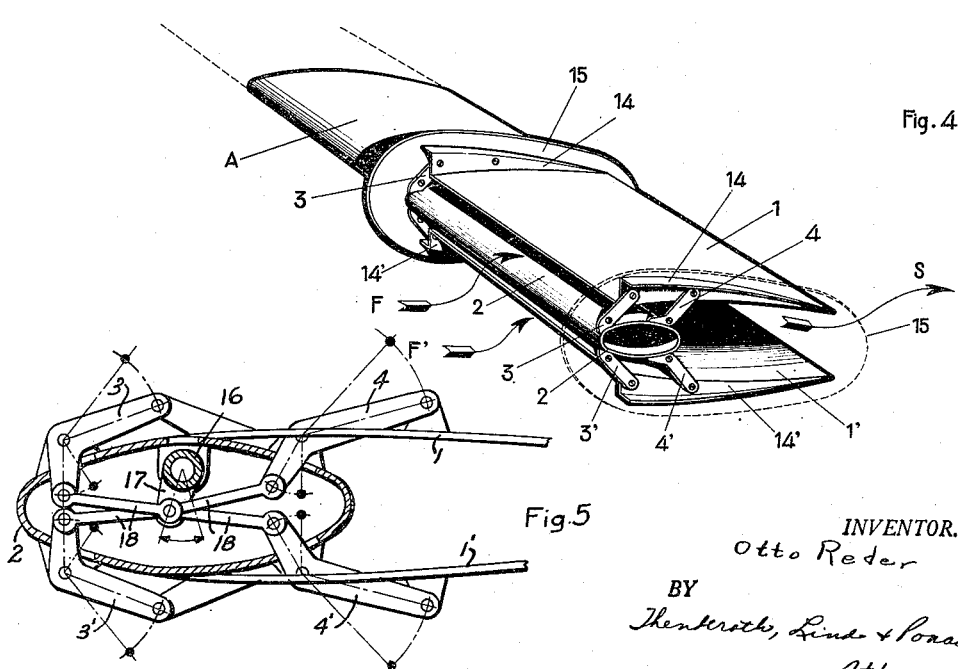
Fig. 4
Fig. 5
INVENTOR.
Otto Reder
BY
Thenkroth, Lind & Ponack
Attorneys.

ı
United States Patent Office 2,700,515
Patented Jan. 25, 1955

2,700,515

AIRPLANE RAM-JET PROPULSION SYSTEM

Otto Reder, Madrid, Spain

Application March 17, 1952, Serial No. 276,989

Claims priority, application Spain
July 31, 1951

7 Claims. (Cl. 244—15)

The present invention relates to a retractable thermo-reactive duct of the "ram-jet" type and of linear extension, i. e., a ram-jet of elongated shape transversely to the direction of motion in contrast to the usually known ram-jets of "circular" or "annular" cross-section. It can be used for aerial propulsion on lifting elements, such as on helicopter rotor blades, propeller blades, wings or control surfaces of aircraft or missiles, as well as for submarine propulsion, such as on fins or control surfaces of submarines.

In application cases where the ram-jet is not the only source of propulsion, it is being used at certain periods as additional means of propulsion to those used during normal cruising conditions. The present invention serves to improve certain imperfections of actual ram-jets and to extend its use for many more applications on aircraft and submarines.

The principal deficiency of actual ram-jets is due to their great resistance offered to the air or fluid (drag) when they are put out of action, either voluntarily by the pilot when their propulsion is not required, or involuntarily due to any failure in its system. On a helicopter e. g. this drag of the ram-jet makes a power-off landing difficult and the effect of the drag is especially detrimental as the ram-jet is used on a part which has the highest rotational speed.

The present invention serves to improve these disadvantages by using a ram-jet of linear extension and of such a shape, that, due to its retractability, and when not in use, the ram-jet will adopt the form of a perfect airfoil section. This form may be considered as the continuation of a wing or blade or control surface, on which the ram-jet has been mounted. The ram-jet alters its shape automatically when it starts working and this alteration requires a relative minmum of requisites.

The linear or elongated extension of the ram-jet, which is a characteristic of this invention, means that a cross-section transversely to the direction of motion is of an elongated shape; the "linear" form can be supposed to be obtained by opening up an "annular" ram-jet and stretching it out, until it becomes a "linear" ram-jet. The location of the ram-jet is preferably at the tip of a wing, blade or other element, but there is no hindrance to mounting it at some other zone of the element.

A principal characteristic of the present ram-jet is the fact, that when combustion is initiated, the gases inside the ram-jet increase their pressure, thus separating the two opposite movable external surfaces of the wing covering which themselves are mounted by suitable articulations between two fixed lateral end-walls which are integral parts of the wing, blade or other element. Thus a hollow ram-jet is created automatically with proper inlet and outlet openings, as long as combustion takes place. When combustion ceases the movable walls close automatically together, changing the shape from a hollow duct into the original closed airfoil section.

The articulations at the fixed end-walls of the combustion chamber may be free or may be controllable by the pilot. In the latter case the pilot is able to alter the inlet and outlet areas either independently of each other or at certain relation to each other in order to regulate the thrust of the ram-jet.

Generally, ignition will be initiated by the known system of a spark plug, and it will be necessary to "atomize" or pulverize the fuel in order to expand it as much as possible over the combustion chamber. Ignition may be initiated in a small special chamber which communicates with the main combustion chamber, deriving a small part of fuel and acting as a form of permanent burner to assure combustion if by any cause the main flame should temporarily weaken or blow out. A good mixture of fuel and air or fluid and therefore a more uniform combustion may be obtained by the turbulence created when the fuel is being introduced against the dynamic pressure of the air or fluid. Furthermore, the provision of flame-holders, generally of a concave shape in downstream direction, will contribute to keep the combustion alive.

In order to prevent the external highly stressed movable walls from being overheated, bulkhead like internal partition walls or guide vanes may be fixed at certain distance from them and almost parallel to them. These guide vanes may be located at the part of highest temperatures, i. e. at the rear openings of the flame holders. Thus a cooling air layer is maintained at the inside of the external semi-walls. The guide vanes need not extend right up to the rear end of the combustion chamber, as the cooling air layer continues in contact with the external semi-walls better than if no guide vanes had been provided at all.

Finally, in order to obtain a proper discharge nozzle shape for the outlet of the gases, some longitudinal reinforcements may be fixed to the trailing edges inside the movable semi-walls, which also serve to prevent undue wear or burning of the trailing edges due to the friction of the hot gas stream.

At the leading edge it might be convenient to fix a sharp edge on to the convex part of the main supporting spar, which forms thus a proper section for working at speeds where compressibility of the air is not negligible. At the same time the sharp edged nose piece might serve as counterweight to balance the center of gravity of the ram-jet in chord-wise direction.

When working under water on submarines as part of their control surfaces or the like, the fluid or water inside the ram-jet may obtain thermic energy caused by any chemical reaction of exothermic type which increases the internal pressure in the ram-jet, causing it to open up and to function similarly as in air forming a hollow duct under dynamic pressure in which fluid is accelerated and ejected rearwards, giving thus a forward propulsion to the ram-jet and the submarine.

In all cases the combustion chamber is laterally closed by two fixed walls which protrude from the profile of the wing and which encase the air or fluid stream, preventing lateral movement of the air or fluid inside as well as outside of the wing or lifting element, and thus improving certain aerodynamic qualities. These sidewalls may contain hollow groove-like excavations which serve to hide the articulation links so as to offer less drag to the stream of air or fluid. The articulation links themselves may be stream-lined or sharp-edged so as to give a minimum of resistance.

In order that the invention may be clearly understood, a case of its realisation will be described hereinafter as non limiting example and with reference to the accompanying drawing, in which the invention is applied to an aircraft wing.

Fig. 1 shows a cross section to the mentioned wing fitted with a ram-jet according to the invention and with the ram-jet inactive.

Fig. 2 is a similar section to Fig. 1 but with the ram-jet in the working or propulsion state.

Fig. 3 is a variant design with regard to the ignition and fuel system, where also internal partition walls or guide vanes have been provided. The full lines show the ram-jet in the working state, the dotted lines show it in the inactive state.

Fig. 4 is a perspective view of the wing zone on to which the ram-jet has been fitted and where the lateral fixed walls can be seen, although one of them has been only indicated by dotted lines in order to show the interior part with the articulation links.

Fig. 5 is a partial cross-sectional view illustrating the manner in which the device is controlled by a pilot.

Parts which have similar function have been designated by the same numbers.

The numbers in the figures represent the following parts:

1 and 1' are the movable external surfaces of the combustion or reaction chamber. 2 is a longitudinal spar of the wing structure. 3 and 3' are systems of articulated links joining the lateral fixed walls with the movable external surfaces of the chamber, guiding them from the initial closed position to the open working position and back. In general there will be two sets of such links, the other sets in our example have been marked by 4 and 4'. For clearness and simplicity, these links have been shown with rectangular cross sections, but these sections may be of a more suitable streamlined or sharp edged shape. Part 5 is a sharp cornered leading edge which completes the front part of the spar 2 to form an efficient high speed profile and which also serves to balance chord-wise the centre of gravity of the ram-jet. 6 is the fuel pipe leading the fuel from the tank of the aircraft to the intermediate pipe 7, which crosses the spar and which ends either in the fuel jets 7' and 7" or in the atomizing nozzle 8 (Fig. 4). The fuel jets 7' and 7" may be pointing forward to ensure a better distribution of fuel in the air, which enters in the direction shown by the arrows F and F'. Figures 1 and 2 shows at 9 a small chamber, which serves to initiate the combustion with the help of a spark plug 10. Parts 11 are flame-holders which obtain turbulent air from the flow either through holes as in Figs. 1 and 2 or through slots as in Fig. 3. Partition walls or guide vanes are at 12 and 12' (Fig. 3). The dotted lines at 12a and 12'a show them in the inoperative state of the ram-jet. In Fig. 3 the parts 13 and 13' represent the longitudinal reinforcement of the trailing edges forming the discharge nozzle; when the jet is working, 13a and 13'a are the same parts, when the jet is closed and inoperative. Fig. 4 shows at 14 and 14' suitably bent lateral edges of the external surfaces 1 and 1' which house the external link attachments and which close the ram-jet chamber against the fixed sidewalls 15 (one of them is shown with dotted lines). The fixed walls 15 carry the central link attachments and may be grooved or excavated suitably to hide the articulation links, so that they don't form an obstruction to the stream of gases.

The way of functioning of the ram-jet is as follows:

When the ignition is started by the spark plug 10, the fuel entering the chamber 9 starts burning and the air between the movable surfaces 1 and 1' aids further combustion. Due to the increase of pressure in the initially closed chamber they separate, giving access to fresh air from the external air-stream which continues entering to the open chamber in direction of the arrows F and F'. As more fuel is being supplied through the fuel jets 7 and 7' (Figs. 1 and 2) or through the nozzles 8 (Fig. 3) the combustion and therefore the internal pressure in the ram-jet is maintained, thus keeping the movable walls separated to a position which may be limited by stops at the articulation links 3, 3', 4 and 4'. The accelerated gases exhaust in direction of the arrow S (Fig. 4) causing a propulsion force due to reaction. When the supply of fuel is throttled down, combustion ceases, the internal pressure in the ram-jet chamber diminishes until it is equal to the ambient pressure. Due to the drag to the air-stream, the movable surfaces are forced backward and close together, guided by the articulation links. The closed ram-jet takes the shape of the airfoil section of the wing on to which it has been fitted.

The same will happen in the cases, where this ram-jet is applied to a blade of a helicopter or propeller, or to a control or stabilizing surface of an aircraft or submarine etc. The advantages of this type of ram-jet are great, as it can be adapted to any kind of lifting, or controlling element without disturbing the external stream-lining.

In Fig. 5 the articulation links 3, 3' and 4, 4' have been extended to the interior of the spar tube 2 and can be actuated by the rods 18 from a lever 17 which is attached to a torque tube 16 which runs along the spar. The torque tube will be actuated by any known type of pilot control.

The invention, within its essential principle, may be subjected to variants of details, and the examples shown are only illustrative and, as already mentioned, not limiting to other possible realizations.

Having now described and ascertained the nature of my said invention and in what manner the same is to be performed, I declare that what I claim as new and desire to secure by Letters Patent is:

1. A ram-jet construction for an airplane comprising a fixed aerofoil element, a combustion chamber, means for supplying fuel to said chamber located on said fixed aerofoil element, said combustion chamber comprising a pair of movable walls, extensible means connecting said walls to said fixed element, said walls being movable by the internal pressure in said combustion chamber to a position spaced on each side of said fixed element to provide an inlet and outlet for said combustion chamber when said ram-jet is operating and movable to form a continuation of the aerofoil construction of said fixed element when said ram-jet is inoperative.

2. A ram-jet as set forth in claim 1 wherein said extensible means includes articulated links.

3. A ram-jet as set forth in claim 1 wherein a chamber is fixed to said fixed element which communicates with said combustion chamber and ignition means are provided in said chamber on said fixed element.

4. A ram-jet as set forth in claim 3 wherein a flame holder is provided upon said chamber upon said fixed element.

5. A ram-jet as set forth in claim 4 wherein partition walls are provided in the interior of said combustion chamber parallel to the movable walls thereof.

6. A ram jet construction for a fluid guided craft comprising a fixed sustaining element, a thermal reaction chamber, means for supplying fuel to said chamber located on said sustaining element, said chamber comprising a pair of movable walls, extensible means connecting said walls to said fixed element, said walls being movable by the internal pressure in said chamber to a position spaced on either side of said fixed element to provide an inlet and outlet for said chamber when said ram jet is operating and movable to form a continuation of the construction of said fixed sustaining element when said ram jet is inoperative.

7. A ram jet as set forth in claim 1 wherein means are provided under the control of the pilot controlling said movable walls.

References Cited in the file of this patent

UNITED STATES PATENTS

| 1,725,914 | Hallowell | Aug. 27, 1929 |
| 2,408,788 | Ludington | Oct. 8, 1946 |
| 2,553,253 | Hays | May 15, 1951 |

FOREIGN PATENTS

| 246,882 | Switzerland | Oct. 16, 1947 |
| 1,001,944 | France | Oct. 31, 1951 |